Dec. 9, 1969   S. ZAROMB   3,482,701
EXTRACTION AND DESALINATION APPARATUS
Filed Feb. 28, 1968

INVENTOR
SOLOMON ZAROMB

INVENTOR.
SOLOMON ZAROMB

United States Patent Office 3,482,701
Patented Dec. 9, 1969

3,482,701
EXTRACTION AND DESALINATION APPARATUS
Solomon Zaromb, 376 Monroe St.,
Passaic, N.J. 07055
Continuation-in-part of application Ser. No. 434,025,
Feb. 19, 1965. This application Feb. 28, 1968, Ser.
No. 732,789
Int. Cl. B01d 29/24, 29/08
U.S. Cl. 210—335          10 Claims

ABSTRACT OF THE DISCLOSURE

Apparatus for separating fluid components is disclosed which utilizes a preferentially absorbing spongy means in conjunction with a transfer and compression means adapted to move relative to the spongy means and to alternately compress and release the latter. Numerous one-way valve means are disposed within the spongy means so as to yield a directed flow of the purified fluid component through successive portions of the spongy means towards an outlet point.

---

This invention relates to apparatus for desalting brines and/or extracting or separating selected components from solutions or other mixtures.

This is a continuation-in-part of my application Ser. No. 434,025, filed Feb. 19, 1965, now abandoned.

In my U.S. Patent No. 3,207,061 issued Sept. 21 1965, I have disclosed apparatus and methods for separating slurries into solid and fluid components. That invention effects continuous filtration by passing a slurry over successive spongy elements which are alternately compressed and allowed to distend. The fluid absorbed from the slurry by the distended segments is forced out upon compression of these segments and drained away by gravity or through one-way valves. The slurry is thus progressively dried as it is urged across these successive spongy elements.

It is the purpose of the present invention to extend the applicability of the afore-mentioned copending invention not only to filtration but also to extraction, desalting and similar separation processes.

It is a further object of my invention to provide a new practical, efficient and economical desalination and extraction means.

It is still another object of my invention to provide a fairly compact desalting and/or extraction means suitable for small-scale applications.

It is yet a further object of my invention to provide an efficient reverse osmosis separation technique dispensing with rapidly deteriorating leakproof membranes.

In achieving the foregoing and other objectives my invention contemplates the use of preferentially absorptive or adsorptive and/or selectively permeable spongy elements in a similar way as in the afore-mentioned copending invention.

My invention can be explained most readily with the aid of the drawing in which.

Figure 1:
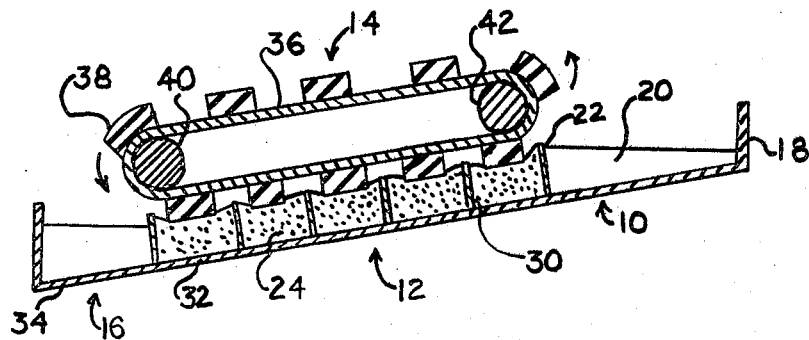
FIG. 1 is a diagrammatic sectional view of one preferred embodiment of the invention.

In FIG. 1 is illustrated a supply means 10, a spongy means 12, a transfer and compression means 14, and a collection means 16.

The supply means 10 may consist of a casing 18 in which is kept the solution or mixture 20, said solution or mixture being in direct contact with an end element 22 of spongy means 12.

Figure 2:
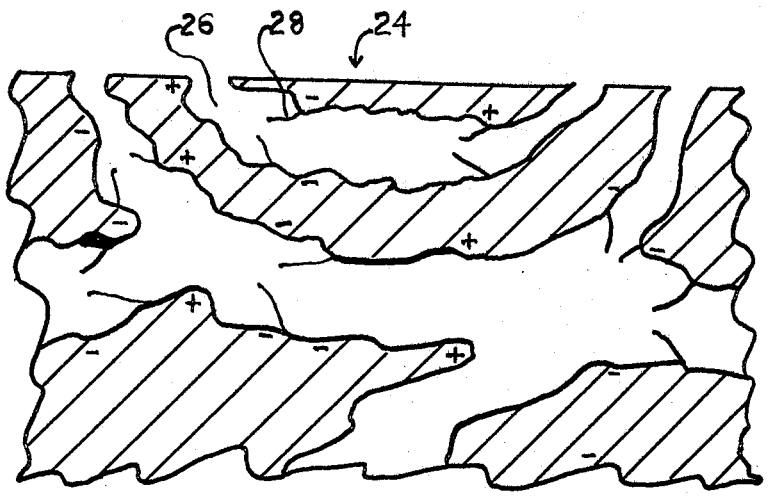
FIG. 2 is a magnified partial diagrammatic sectional representation illustrating certain preferred functional features of the selectively permeable and/or preferentially absorptive or adsorptive spongy elements of FIG. 1.

The spongy means 12 consists generally of one or more rectilinearly aligned spongy segments 24 which is or are selectively permeable to and/or selectively adsorptive or absorptive toward one or more selected component or components of the solution or mixture 20. In particular, when the latter consists of a salt solution, especially an aqueous solution such as sea-water or other brine, the selection effect can be obtained with spongy elements comprising alternately interspersed cation- and anion-exchange resins, e.g., polystyrene or other polymerized hydrocarbon matrices comprising fixed sulfonate groups linked to cation-exchange polymers or fixed tertiary amino and/or quaternary ammonium groups linked to anion-exchange type polymer resins. Because the cation-exchange resins tend to repel and hence present obstructions to the passage of anions, while the anion-exchange resins tend similarly to obstruct the flow of cations, the pores 26 within spongy segments 24 are more permeable to water or similar solvents than to the salts dissolved therein. Moreover, the Donnan equilibrium effects due to the fixed charges within the resins also result in a partial preference for the solvent rather than the salt. The configuration of FIG. 2 is thus both preferentially permeable and preferentially absorptive or adsorptive toward the solvent.

Pores 26 may also preferably contain protrusions 28 constituting valve-like structures which permit forward flow (from right to left in FIG. 2) but interfere with backward flow. Such valve-like structures are, of course, commonly encountered in the circulatory systems of animals or plants, e.g., in the veins and arteries, where they serve to maintain uni-directional flow of essential fluids. Alternately, one-way valves (not shown) may be incorporated in the boundary elements 30 between individual segments 24 or between said segments and the supply or collection means 10 or 16. The function of the one-way valves constituted by the protrusions 28 or incorporated into the boundary elements 30 is to ensure uni-directional solvent flow through each spongy element 24 as the latter is alternately compressed and released. The boundary elements 30 may consist of flexible but liquid-impermeable material, such as solid rubber, perforated with numerous one-way valves. When said uni-directional flow can be adequately effected by the protrusions 28, the boundary elements 30 may be altogether eliminated.

In cases where the solution or mixture comprises solid or colloidal particles, the external surface regions of spongy segments 24 may comprise finer pores than the main body of said segments in order to prevent, or minimize or obstruct the entrance of said particles into said spongy segments.

Segments 24 are supported on a frame or casing 32 which may either be separated from or form an integral part with casings 18 and/or 34 appertaining to supply and collection means 10 and 16, respectively.

The transfer and compression means 14 comprises an end-less belt 36 on which are mounted a plurality of spaced and parallel protrusions 38 which are preferably of a flexible material such as solid rubber or plastic, or the like. Said protrusions 38 are of a thickness whereby when traversing the spongy segments 24 they compress the same to prime the segments for absorbing water (or equivalent solvent) from the solution or mixture being processed thereby.

Protrusions 38 are preferably of a length (perpendicular to the drawing) which is equal to that of segments 24 so that said protrusions can sweep the entire surface of said segments. In cases where boundary elements 30 are required, it may also be preferable to have protrusions 38 also of the same width as segments 24 so that said portrusions could occupy the full span between nearest elements 30. This can ensure adequate expression of fluid from each segment 24 on each passage across it of a protrusion 38.

In operation, the protrusions 38 sweep the relatively concentrated solution or mixture situated above segments 24 upward and back toward supply means 10, while simultaneously expressing the relatively dilute solution or mixture contained within said spongy elements through the aforementioned one-way valves toward collection means 16. The solution or mixture expressed from each segment is then partly absorbed by an adjacent segment having been primed for such absorption by the consecutive compression and release effected by the antecedent passage of the same protrusion 38.

Operation of belt 36 is effected through a drive shaft 40 and an idler shaft 42, the method and operation of endless belt 36 being too well known to warrant detailed discussion.

The movement of belt 36 is thus seen to effect gradual purification of the solvent as the latter is forced toward collection means 16 in alternating absorption-expression steps. At the same time, the more concentrated fractions of said solution or mixture are continually swept back into supply means 10. The mixture or solution 20 in said supply means may be replaced continuously or intermittently by fresh mixture or solution in order to avoid an excessive concentration build-up. *The entire process may be regarded as equivalent to multi-stage fractionation by reverse osmosis.*

It is well recognized that reverse osmosis should provide in theory the most efficient way of separating solvents from solutions. However, the membrances used at present, such as the cellulose acetate membranes used in currently proposed water desalting projects, tend to develop leaks and to deteriorate rather fast in service. These difficulties arise at least in part from the fact that the membranes must be thin in order to permit an appreciable flow of water through them, yet they must be capable of withstanding the high pressure gradients required to effect said flow. Moreover, any appreciable leaks through such membranes render the latter immediately useless.

In my invention, on the other hand, the selectively permeable and/or preferentially absorptive or adsorptive spongy elements constitute in effect a series of relatively leaky membranes placed back-to-back. Because the pores within the spongy elements are larger than in usual membranes, flow through them can be effected without applying excessive pressures. Because the spongy elements are in series, it is not necessary that separation be achieved by each single element, hence moderate leaks become permissible. Because the fractionation through any one element is only partial, only moderate pressures suffice to effect such fractionation. Furthermore, the process is aided by the alternated compression and release steps and by the tendency of the spongy elements to swell and absorb fresh solvent spontaneously after each compression-release sequence.

It may also be noted that the configuration of FIG. 1 is essentially similar to the first embodiment of my aforementioned U.S. Patent No. 3,207,601. Obviously, the alternate embodiments discussed therein are also valid in the present case. My invention may thus also operate with the spongy means 24 moving with respect to the protrusions 38, as well as vice versa, either in a planar (or sheet-like) configuration resembling FIG. 1 or in the round, e.g., conical or cylindrical, configuration of FIG. 3 wherein a spongy segment or segments 64 affixed to a supporting round surface 66 and helical or otherwise curved protrusions 68 affixed to a second round co-axial support 70 are caused to revolve with respect to one another by a central shaft 72, as in said concurrent invention.

Neither is my invention limited to any single type of flow of the purified fluid with respect to the relatively impure fluid mixture. Just as in other separation processes, the flows of the pure and impure fluids may be parallel, countercurrent or crosswise, as shown schematically in FIG. 3.

Figure 3A:
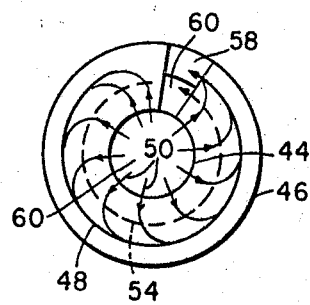
FIG. 3 is a schematic diagrammatic representation illustrating other possible embodiments of the invention.
Figure 3B:
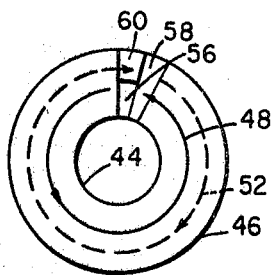

In FIG. 3 a circular configuration is represented which may be either a simple type of sheet-like circular conveyor belt similar to the linear type apparatus of FIG. 1 or a more compact conical or cylindrical structure resembling FIG. 2 of my afore-cited U.S. Patent No. 3,207,061. In either case is the spongy means confined between the inner cylindrical, conical or otherwise curved wall 44 and the outer wall 46. The solid arrows 48, 50 represent the main direction of flow of the impure fluid outside the spongy means, whereas the broken arrows 52, 54 indicate the main flow direction of the fluid passing through the spongy means. In FIG. 3B the untreated fluid fed from an inlet reservoir 56 is swept over the surface of the spongy means by protrusions 38 (similar to those of FIG. 1) or by an equivalent sweeping mechanism along the direction of arrow 48 toward the concentrated fluid outlet 58, while the flow through the spongy means is channeled in the opposite direction shown by arrow 52 toward the purified fluid outlet 60. This would represent a standard countercurrent separation process.

Figure 3C:
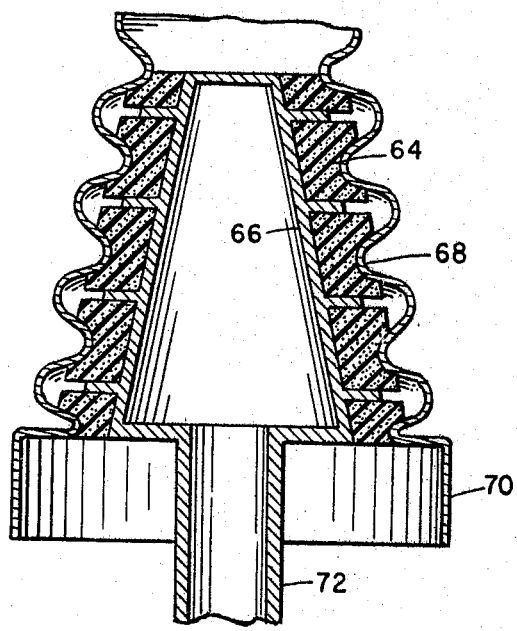

Alternately, as indicated in FIGS. 3A and 3C, the untreated fluid may enter from a central reservoir or tube 62 through a plurality of one-way valves or over the surface of the spongy means along arrows 50 perpendicularly to the main flow direction 54 of the purified fluid channeled through the spongy means. The purified fluid may then be again collected at outlet 60, while the impure or concentrated fluid is swept outside the spongy means toward outlet 58. In the configuration of FIG. 3C, the respective outlets 58 and 60 may be located above and below the endmost spongy segments, or vice versa, depending on the direction of rotation of shaft 72 relative to support 70.

There will now be obvious to those skilled in the art many modifications and variations of the apparatus and techniques disclosed herein. Such modifications and variations will not, however, depart from the scope of the invention if defined by the following claims.

1. Apparatus for separating at least one fluid component from a fluid mixture comprising a spongy means; a fluid mixture supply source connected to one point of the spongy means; a purified fluid component outlet connected to another point of the spongy means; the spongy means being so constructed that it preferentially absorbs at least one fluid component from the mixture; means causing the fluid mixture to flow across the surface of the spongy means; transfer and compression means adapted to move relative to the spongy means for assisting transfer of the fluid mixture across the surface of said spongy means and for alternately compressing and releasing the spongy means so as to enable the latter to absorb a relatively pure fluid component from the fluid mixture; and a plurality of one-way valve means within the body of said spongy means; said one-way valve means, said spongy means, and said transfer and compression means being so constructed and arranged to drive the preferentially absorbed relatively pure fluid component within the spongy means through further successive portions of said spongy means beneath said surface of said spongy means to further purify the fluid component and to expel the purified fluid component at the outlet point.

2. Apparatus as claimed in claim 1, wherein the region near at least some external surfaces of said spongy means comprise finer pores than the main body of said spongy means.

3. Apparatus as claimed in claim 1, wherein said spongy means comprises ion exchange resins.

4. Apparatus as claimed in claim 3, wherein said exchange resins comprise groups selected from the family consisting of sulfonate, quaternary ammonium, and tertiary amino groups linked to a polymerized hydrocarbon matrix.

5. Apparatus as claimed in claim 4, wherein said matrix is polystyrene.

6. Apparatus as claimed in claim 1, wherein said spong means has a sheet-like configuration and said transfer and compression means comprises an endless belt and a plurality of longitudinally spaced protrusions on said belt adapted to sweep said mixture across said spongy means while compressing the latter.

7. Apparatus as claimed in claim 1 comprising a round support on which said spongy means is mounted, and wherein said transfer and compression means comprises at least one curved protrusion on a round supporting body, said round support and supporting body being coaxial and relatively rotatable.

8. Apparatus as claimed in claim 1, wherein said transfer and compression means comprises solid protrusions disposed at least in part cross successive portions of said spongy means, said protrusions and spongy means being adapted for relative motion therebetween.

9. Apparatus as claimed in claim 8 comprising, and wherein said protrusions are spaced longitudinally on an endless belt.

10. Apparatus as claimed in claim 8, wherein said protrusions are in the form of at least one curve on a round supporting body.

References Cited

UNITED STATES PATENTS

| | | | |
|---|---|---|---|
| 2,860,973 | 11/1958 | Wells | 210—396 X |
| 2,866,827 | 12/1958 | Jurgeleit et al. | 210—24 X |
| 3,122,456 | 2/1964 | Meier et al. | 210—24 X |
| 3,176,607 | 4/1965 | Lapham | 210—350 X |
| 3,207,061 | 9/1965 | Zaromb | 210—350 X |
| 3,334,042 | 8/1967 | Teitsma | 210—24 X |

FOREIGN PATENTS

| | | |
|---|---|---|
| 1,328,710 | 4/1963 | France. |
| 953,522 | 11/1956 | Germany. |

REUBEN FRIEDMAN, Primary Examiner

C. DITLOW, Assistant Examiner

U.S. Cl. X.R.

210—24, 37, 38, 350